Patented Aug. 17, 1948

UNITED STATES PATENT OFFICE

2,447,214

OPTICALLY ACTIVE SALTS OF THE LYSERGIC AND ISOLYSERGIC ACID DERIVATIVES AND A PROCESS FOR THEIR PREPARATION AND ISOLATION

Arthur Stoll and Albert Hofmann, Basel, Switzerland, assignors to Sandoz Ltd., Fribourg, Switzerland, a Swiss firm No Drawing. Application August 23, 1943, Serial No. 499,714. In Switzerland September 16, 1942

16 Claims. (Cl. 260—236)

The preparation and the isolation of the therapeutically valuable and active derivatives contained in ergot is a problem that has occupied chemistry and pharmacy for more than 120 years. Actually it is known that the action of ergot is due to the alkaloids contained therein, which have been isolated in recent years and which are always present as pairs of isomers. Chronologically the following alkaloids have become known up to now:

| | |
|---|---|
| Ergotinine (1875) | Ergotoxine (1906) |
| Ergotamine (1918) | Ergotaminine (1918) |
| Ergobasine (1935) | Ergobasinine (1935) |
| Ergosinine (1936) | Ergosine (1936) |
| Ergocristine (1937) | Ergocristinine (1937) |

The long period which has been necessary in order to isolate the active compounds of ergot shows the great difficulties which are encountered with regard to their isolation and preparation in a pure form. These difficulties are especially due to the complication and especially to the easy decomposition of the ergot alkaloids which become transformed into dark amorphous products already under the action of light and of the air-oxygen. Also acids as well as alkalis and in some cases even solvents are capable of transforming the ergot alkaloids, this being proved by the fact that they become dark colored and lose their crystallisation power. Further difficulties lay in the fact of the easy transposition of the levo-rotary form into the dextro-rotary form of the alkaloids this leading again to mixtures which may be crystallised only with difficulties.

The ergot alkaloids having the properties of producing mixed crystals between the levo- and dextro-rotary form, often false conclusions have been made, so that mixtures of different products have often been considered as pure individuals. It will be seen in the following that the property of alkaloids consisting in giving isomorph crystallisations has also led to the fact that preparations from ergot have been considered as uniform compounds, whereas in truth they were mixtures of different alkaloids.

The great decomposition power of the ergot alkaloids is based on the lability of the basic radical which is characteristic for all the alkaloids. This radical is the lysergic acid of the formula $C_{15}H_{15}N_2COOH$. The said compound consists of an unsaturated nitrogen-containing ring system, the constitution of which is hitherto not completely cleared up and which is present in two isomer forms turning easily into each other. The ergot alkaloids known up to now correspond to the general formula $C_{15}H_{15}N_2COR$; therefore, the individual ergot alkaloid pairs differ from each other only in the constitution of the substituent R which is linked to the carboxylic group of the lysergic acid.

The synthetically prepared derivatives of the lysergic acid which also correspond to the above cited formula possess also the same lability as the natural lysergic acid derivatives. Their isolation and preparation encounters the same difficulties as in the case of the lysergic acid hydrazides $C_{15}H_{15}N_2CONHNH_2$ (made according to U. S. Letters Patent 2,090,429) and in the case of the alkaloids of the type of ergobasine, which can be prepared by partial synthesis and in which the lysergic acid is combined with an amine in form of an acid amide (see U. S. Letters Patent No. 2,090,430).

The separation of the natural as well as of the synthetical lysergic acid derivatives has been generally carried out by conversion into inorganic or organic acid salts. For instance, ergotoxine was purified, many years before the base was obtained in a crystallized form, by converting the same into its phosphate which crystallizes in a conglomeration of needles. The technical literature further described salts of ergot alkaloids with sulfuric acid, hydrochloric acid, oxalic acid, tartaric acid, picric acid and the like. Although these salts possess sometimes good crystallisation properties, they are generally so rapidly decomposed that they cannot be used for repeated recrystallisations. Therefore, they are generally not useful for the preparation of lysergic acid derivatives in pure forms. The dextro-rotary isomers of he ergot alkaloids, the derivatives of the iso-lysergic acid, give with the generally used acids no crystallized salts at all.

It has now been found that new suitable compounds are obtained by converting compounds containing the lysergic acid radical into acid salts of acylated tartaric acids of the formula

HOOC.CHOX—CHOX.COOH wherein X stands for an aroyl radical, like for instance benzoyl or p-toluyl, the new compounds being very suitable for the separation and preparation in pure form of basic compounds containing the lysergic acid radical and corresponding to the general formula $C_{15}H_{15}N_2COR$. The obtained new salts possess an excellent crystallizing property, stability, good solubilisation properties and an astonishing separation property. They can, without noticeable loss of substance, be recrystallized several times. It appears that the above cited substituted tartaric acids give besides the pure salt formation a stable combination with the lysergic acid radical thus decreasing the lability of the lysergic acid. Moreover, it is astonishing that the derivatives of the strongly dextro-rotary isolysergic acid give also stable salt compounds with the above cited substituted tartaric acids.

In order to carry out the new process we use generally dibenzoyl- and di-(p-toluyl) tartaric acids, but also differently substituted tartaric acids may be used for the preparation of stable salts with natural and synthetical lysergic acid derivatives. Such substituted tartaric acids are for example the dianisoyl-, di-(2-methoxybenzoyl)-, di-veratroyl-, di-(α-naphthoyl)-tartaric acid and the like.

The formation of the salts is preferably carried out by dissolving the components in a solvent like methanol, ethanol, acetone, or in another organic solvent miscible in water and by mixing the solution of the components in equimolecular quantities. The desired salts crystallize out immediately or can be brought to crystallization in fractions by adding water in small quantities. The salt formation can also be carried out by mixing for instance the barium salt of a substituted tartaric acid with the sulfate of the alkaloid.

The usefulness of the new compounds for the preparation in pure state of the active compounds of ergot and especially for the separation of the mixtures of ergot alkaloids into their components is proved by the fact, that, according to the present process, it is possible to separate ergotoxine, which has been isolated in 1906 and which has always been considered as a homogeneous chemical compound, into 3 different alkaloids, two of which have not been known hitherto.

For instance, different ergotoxine-preparations which have been recrystallized from benzene and which crystallize from this solvent in beautiful, brilliant and uniform plates containing benzene of crystallization, and which preparations possess all of the properties mentioned in the literature, such as for instance the optical rotation and the decomposition point, have been converted into the acid salt by means of l-di-(p-toluyl)-tartaric acid. The white crystal mass thus obtained has been decomposed by means of ethanol into a difficultly soluble fraction (I) and into an easily soluble fraction. This easily soluble fraction was then dissolved in methanol, whereby a rather difficultly soluble fraction (II) crystallized out. The easily soluble fraction (III) has been crystallized by adding water until the methanolic mother-lye became turbid. Fraction I was then recrystallized from absolute ethanol, fraction II from methanol and fraction III from methanol under addition of water.

The following table shows the property of the salts of the three alkaloids thus obtained:

| fraction | melting point (corr.) decomposition | $[\alpha]_D^{20}$ (in ethanol) | solubility |
|---|---|---|---|
| I | °C. 187 | Degrees +68 | difficultly soluble in ethanol and methanol. |
| II | 186 | +103 | soluble in the thirty fold quantity of hot methanol. |
| III | 180 | +103 | easily soluble in ethanol and methanol. |

The alkaloids freed from the above salt fractions are three different and uniform chemical individuals. The base obtainable from fraction I is identical with ergocristine described by A. Stoll and E. Burckhardt (Hoppe-Seyler's Ztschr. f. physiol. Chem. 250, 1 (1937)), while the alkaloids obtainable from fractions II and III are heretofore unknown ergot alkaloids, to which we have given the names of ergocryptine and ergocornine respectively. The expression "ergotoxine" shall, therefore, be used as a denomination for the isomorphic crystallisation of the three parent alkaloids ergocristine, ergocornine and ergocryptine. In the ergotoxine preparations actually analysed the ergocornine represents the main quantity.

The composition and the most important properties of the three alkaloids obtained from ergotoxine according to the new process are illustrated in the following table:

| | ergocristine | ergocryptine | ergocornine |
|---|---|---|---|
| empirical formula | $C_{35}H_{39}O_5N_5$ | $C_{32}H_{41}O_5N_5$ | $C_{31}H_{39}O_5N_5$. |
| decomposition point (corr.) | 160°–170° C | 208°–210° C | 182°–184° C. |
| $[\alpha]_D^{20}$ (c=1 in $CHCl_3$) | −183° | −187° | −188°. |
| $[\alpha]_{5461}^{20}$ (c=1 in $CHCl_3$) | −221° | −226° | −226°. |
| crystallization from methanol | easily soluble | prisms | polyhedrons. |

On treatment with acids or alkalis or on heating in ethanol, the new alkaloids may be transformed, like ergocristine and all the other ergot alkaloids known up to now, into their strongly dextro-rotary isomers. We have given to these new isomers the names of ergocryptinine and ergocorninine, as this nomenclature is usual in this class of compounds.

The following table gives the principal properties of the isolysergic acid forms of the three alkaloids of the ergotoxine group.

| | ergocristinine | ergocryptinine | ergocorninine |
|---|---|---|---|
| empirical formula | $C_{35}H_{39}O_5N_5$ | $C_{32}H_{41}O_5N_5$ | $C_{31}H_{39}O_5N_5$. |
| decomposition point (corr.). | 220°–222° C | 240°–242° C | 220°–222° C. |
| $[\alpha]_D^{20}$ (in $CHCl_3$) | +371° | +408° | +409°. |
| $[\alpha]_{5461}^{20}$ (in $CHCl_3$) | +463° | +508° | +510°. |
| solubility in ethanol | difficultly soluble | moderately soluble | easily soluble. |
| crystallisation from ethanol. | needles | needles | large prisms. |

On cleavage of the three alkaloids of the ergotoxine group the following constituents of the alkaloids have been found:

| | | | | |
|---|---|---|---|---|
| ergocristine | lysergic acid | dimethyl-pyroracemic acid amide. | d-proline | l-phenyl-alanine. |
| ergocryptine | do | do | do | l-leucine. |
| ergocornine | do | do | do | l-valine. |

In the ergocornine l-valine has been found for the first time as constituent of an ergot alkaloid.

The present process based on the use of the salts of substituted tartaric acids has been also applied with great success for the separation of alkaloid mixtures which are obtained for instance during the partial synthesis of ergobasine or compounds similar to ergobasine. In these compounds the carboxyl group of lysergic acid is linked in form of an amido linkage to an amino alcohol.

By working according to the process of the U. S. Letters Patent 2,090,430, thus using as starting compounds d,l-isolysergic acid azide and condensing the same with (+)-2-aminopropanol-1, an isomorphic crystallized mixture consisting of d-isolysergic acid-(+)-isopropanolamide (ergobasinine) and l-isolysergic acid-(+)-isopropanolamide is obtained, which mixture cannot be decomposed into its components by a usual crystallisation. If, however, this mixture of alkaloids is first converted into a salt of a suitably substituted tartaric acid for instance into the acid salt of d-dibenzoyltartaric acid, then by recrystallization from methanol it will be possible to obtain pure ergobasinine-d-dibenzoyltartrate in form of difficultly soluble crystals, whereas the stereoisomeric l-isolysergic acid-(+)-isopropanolamide-d-dibenzoyltartrate remains in solution.

Also with still simpler derivatives of lysergic acid of the formula $C_{15}H_{15}N_2COR$, wherein R represents for example the hydrazine radical, suitable salts will be obtained with substituted tartaric acids which are perfectly stable and suitable for the separation of the isomers.

In this manner it is possible to effect the separation of the d,l-isolysergic acid hydrazide into its optically active isomers in a nearly quantitative yield, the d,l-isolysergic acid hydrazide which is obtainable by the interaction of hydrazine with lysergic acid derivatives (see U. S. Letters Patent 2,090,429) by preparing the acid salt in methanol solutions by means of d- or l-di-(p-toluyl)-tartaric acid. By using the d-acid the l-isolysergic acid hydrazide salt crystallizes out, while the salt of the dextro-rotary antipode remains in solution. On the other hand, by using the l-di-(p-toluyl)-tartaric acid for the salt formation, the d-isolysergic acid hydrazide salt precipitates in form of a rather difficultly soluble crystallizate.

The above cited examples show the advantages resulting from the new process for the separation of the mixtures of ergot alkaloids. By using d- or l-tartaric acid and by suitably selecting the aroyl substituent of the tartaric acid it is now possible to separate mixtures of lysergic acid compounds by simple fractional crystallization into pure, uniform compounds.

One object of the present invention is therefore the use of acylated tartaric acids for the separation of mixtures of basic compounds containing the lysergic acid radical, into their pure components.

Another object of the present invention consists in the new salts produced by interaction of basic compounds containing the lysergic acid radical with acylated tartaric acids, which possess excellent crystallisation properties and allow the preparation of the pure bases of the alkaloids containing the lysergic acid radical. The expression "basic compounds containing the lysergic acid radical" used in the present specification is employed to designate the synthetical and the natural alkaloids and the other basic compounds containing in their molecule as one of the constituents the radical of the optically active or inactive lysergic and isolysergic acids.

The present invention will now be illustrated by the following examples, wherein the parts are by weight.

*Example 1*

32.5 parts (0.1 molecule) of the crystallized condensation product, prepared according to the process of the U. S. Letters Patent 2,090,430 by interaction of d,l-isolysergic acid azide with (+)-2-aminopropanol-1, which therefore consists in a mixture of d-isolysergic acid-(+)-isopropanolamide (ergobasinine) and of l-isolysergic acid-(+)-isopropanolamide and which possesses in chloroform the specific rotation of $[\alpha]_D^{20}=+30°$, are dissolved in 400 parts of methanol and treated at the boiling temperature with a solution of 35.8 parts (0.1 mol.) of di-dibenzoyl tartaric acid (prepared according to F. Zetsche and M. Hubacher, Helvetica Chimica Acta, 9, 291 (1926)) in 100 parts of methanol. The crystallization takes place immediately. After cooling down and allowing the reaction mass to stand for several hours in a refrigerator, the crystal mass consisting of white pointed prims is filtered by suction and washed with some methanol. Thus, 30.5 parts of practically pure ergobasinine-dibenzoyl tartrate are obtained, this corresponding to a yield of 89% of the theory.

In order to prepare the free base, the salt thus obtained is suspended in water, then an excess of a sodium bicarbonate solution is added thereto and the base extracted with ether. After evaporation of the ether and treating the residue with a small quantity of acetone the residue crystallizes in beautiful prisms. Melting point 196° C. (corr.) under decomposition. Specific rotation $[\alpha]_D^{20}=+415°$ in chloroform. This substance is identical with the natural ergobasinine.

By treating the mother-lye of ergobasinine-d-dibenzoyltartrate with alkali and recrystallizing the free base from acetone, pure l-isolysergic acid-(+)-isopropanolamide having the melting point 192° C. (corr.) under decomposition and a specific rotation $[\alpha]_D^{20}=-351°$ in chloroform will be obtained.

*Example 2*

28.2 parts of d,l-isolysergic acid hydrazide ($\frac{1}{10}$ molecule), prepared according to the U. S. Letters Patent 2,090,429, are finely pulverized and suspended in 450 parts of boiling methanol. While thoroughly stirring a solution of 38.6 parts of d-di-(p-toluyl)-tartaric acid ($\frac{1}{10}$ molecule) in 100 parts of methanol is added to the said suspension. After some seconds the hydrazide goes completely in solution, whereupon the l-isolysergic acid hydrazide-d-di-(p-toluyl)-bitartrate begins immediately to crystallize out in form of white needles. After cooling down to the room temperature and allowing the whole to stand for about 1 hour, the crystals are filtered off and washed with methanol. 30 parts of practically pure l-isolysergic acid hydrazide-d-di-(p-toluyl)-bitartrate are thus obtained. Specific rotation $[\alpha]_D^{20}=-215°$ ($c=0.4$ in 50% ethanol). After a single recrystallization from methanol the optically pure salt will be obtained showing then the specific rotation of $[\alpha]_D^{20}=-238°$.

In order to recover the free l-isolysergic acid hydrazide the salt is treated in an aqueous suspension with sodium bicarbonate and the hydrazide extracted with ethyl-acetate. After evaporation of the ethyl acetate the residue is dissolved in methanol, from which the pure l-isolysergic acid hydrazide of the formula $$C_{15}H_{15}N_2CONHNH_2$$

crystallizes in form of beautiful prisms. Melting point 202°–204° C. (corr.) under decomposition. Specific rotation $[\alpha]_D^{20} = -452°$ ($c=0.8$ in pyridine).

From the methanolic mother-lye of the l-isolysergic acid hydrazide-d-di-(p-toluyl)-bitartrate the d-isolysergic acid hydrazide salt can be obtained as a raw product by evaporation in vacuo. For the preparation of the pure d-isolysergic acid hydrazide it is advantageous to use the l-di-p-toluyltartaric acid for splitting off the d-l-isolysergic acid hydrazide. In this case the d-isolysergic acid hydrazide-l-d-(p-toluyl)-bitartrate precipitates as a more difficultly soluble crystal mass. By treating the same with sodium bicarbonate and extracting with ethyl acetate the d-isolysergic acid hydrazide of the formula $C_{15}H_{15}N_2CONHNH_2$ crystallizes out from methanol in beautiful prisms melting at 202°–204° C. (corr.) under decomposition and possessing the specific rotation of $[\alpha]_D^{20} = +452°$ C. ($c=0.8$ in pyridine).

The di-(p-toluyl)-tartaric acid is not described in the literature and can be prepared by esterification of d- and l-tartaric acid respectively with p-toluyl chloride according to the process described in Helvetica Chimica Acta, 9, 291 (1926).

The di-(p-toluyl)-tartaric acid possesses the formula $C_{20}H_{18}O_8$ and melts, when recrystallized from water, at 170°–172° C. (corr.) under decomposition. The d-di-(p-toluyl)-tartaric acid prepared from d-tartaric acid has the specific rotation of $[\alpha]_D^{20} = -140°$ ($c=1.0$ in ethanol), whereas its optical antipode has the specific rotation of $[\alpha]_D^{20} = +140°$.

*Example 3*

The ergotoxine-preparation used for the separation into its constituents was crystallized twice from benzene and possessed the following properties which correspond to those found in the technical literature for ergotoxine: it crystallized from benzene in uniform brilliant, strongly light-breaking plates which on drying in high vacuo at 80° C. lose 21% of their weight which represents the quantity of the crystallisation solvent and was easily soluble in ethanol, methanol, acetone, chloroform, ethylacetate, but sparingly soluble in ether and not crystallizable from these solvents. The product dried in high vacuo melted between 170° and 200° C. under decomposition and possessed a specific rotation of $[\alpha]_D^{20} = -185°$ (in chloroform). The phosphate of this ergotoxine preparation crystallized from 90% ethanol in round aggregates consisting of fine needles.

30 parts of the ergotoxine possessing the above characteristics (1/20 molecule) are dissolved without warming in 150 parts of absolute ethanol and mixed with a solution of 19.3 parts of l-di-(p-toluyl)-tartaric acid (1/20 molecule) in 100 parts of absolute ethanol. On careful addition of totally 250 parts of water which are added thereto within half an hour under good stirring, the salt began to precipitate after a short time from the bright brown solution in form of white crystal needles; finally the whole solution became converted into a thick crystal paste. After filtration by suction and subsequent washing with 50% aqueous ethanol 48 parts of dry, practically colorless crystals were obtained.

The salt thus obtained was then introduced into 960 parts of boiling absolute ethanol, whereby it became rapidly dissolved. After a rapid cooling down to room temperature and rubbing the walls with a glass stick, a fraction which is difficultly soluble in ethanol began to crystallise out. In order to complete the crystallisation the mass was allowed to stand for about 5 hours. After filtration, washing with ethanol and drying 11 parts of a product (fraction I) were obtained. The alcoholic mother-lye was then evaporated to dryness in vacuo and the residue dissolved in 370 parts of boiling methanol. After cooling down the solution, the crystallization of a difficultly soluble salt took place. The crystals then separated and dried, weighed 10 parts (fraction II).

The methylalcoholic mother-lye (400 parts) were diluted with 400 parts of water. In order to complete the crystallization taking place the mixture was allowed to stand for 5 hours, whereupon the crystals have been filtered off and washed with 50% aqueous methanol. After drying the crystals weighed 24 parts (fraction III).

The fraction I was purified in the following way: It was dissolved in chloroform, the chloroform solution evaporated to dryness in vacuo and the amorphous residue dissolved in 220 parts of absolute ethanol. From this solution 8 parts of pure ergocrystine-l-di-(p-toluyl)-bitartrate crystallized out in form of a conglomerate of pointed sheets which are difficultly soluble in methanol and ethanol. The decomposition point of the product is 187° C. (corr.). $[\alpha]_D^{20} = +68°$ ($c=0.2$ in ethanol).

The free ergocristine was isolated by suspending the salt in water, treating it with sodium bicarbonate and extracting the same with chloroform. After evaporation of the chloroform solution the amorphous residue was crystallized from acetone, whereby beautiful prisms with a decomposition point of 160°–170° C. were obtained. The ergocristine is very easily soluble in methanol and ethanol and cannot be crystallized from these solvents, this being a specific difference from the alkaloids ergocryptine and ergocornine. From the hot saturated solution in benzene it crystallizes out in beautiful plates containing crystal solvent and possessing the same habitus as the benzene crystallisate of ergotoxine. $[\alpha]_D^{20} = -183°$;

$$[\alpha]_{5461}^{20} = -221°$$

($c=1$ in chloroform).

Also the other properties are identical with those given for ergocristine in the work of A. schrift. f. physiolog. Chemie, 250, 1 (1937)).

For the purification the fraction II (10 parts) was dissolved by a short boiling in 10 times its weight of methanol. On cooling down 7 parts of the salt crystallized out. This salt was then subjected to a repeated recrystallization, first in 20 times, then in 30 times its weight of boiling methanol. In this manner 3.5 parts of pure ergocryptine-l-di-(p-toluyl)-bitartrate were obtained in flat needles melting under decomposition at 186° C. (corr.) and possessing the specific rotation of $[\alpha]_D^{20} = +103°$ ($c=0.2$ in ethanol).

The free ergocryptine was recovered by treating its suspension in water with sodium bicarbonate and extraction with chloroform. After evaporation to dryness the amorphous residue was crystallized from ethanol, whereby pointed prisms with the decomposition point of 210° C. (corr.) were obtained. Ergocryptine crystallizes from methanol in straight cut prisms. It is easily soluble in chloroform. From the hot saturated benzene solution it crystallizes out in beautiful brilliant plates containing crystal solvent and possessing the same habitus as the benzene crystallizate of ergotoxine. $[\alpha]_D^{20} = -187°$;

$$[\alpha]_{5461}^{20} = -226°$$

($c=1$ in chloroform). According to the analysis the product has the following composition $C_{32}H_{41}O_5N_5$.

On acid and alkaline hydrolysis and on thermic cleavage in high vacuo the following constituents of the ergocryptine have been isolated: lysergic acid, dimethyl-pyro-tartaric acid amide, d-proline and l-leucine. The condensation of the four cleavage products under elimination of 3 molecules of water yields a product of the formula $C_{32}H_{41}O_5N_5$ which corresponds to the result obtained by analysis.

By boiling with methanol it is possible to transform ergocryptine into its dextro-rotary isomer. Ergocryptinine crystallizes from methanol and ethanol in long needles melting under decomposition at 240°–242° C. (corr.). Its optical rotation is $[\alpha]_D^{20} = +408°$;

$$[\alpha]_{5461}^{20} = +508°$$

($c=1$ in chloroform).

According to the elementary analysis the ergocryptinine possesses the formula $C_{32}H_{41}O_5N_5$.

In order to purify the fraction III the crystals were first dissolved in 10 times their weight of methanol, whereby after standing 1.4 parts of the salt of the ergocryptine fraction crystallized out. After separation of these crystals the methanolic mother-lye was diluted with water in order to give a 80% aqueous methanol solution, whereby the ergocornine-l-di-(p-toluyl)-bitartrate crystallized out. These crystals were then recrystallized three times from methanol (in 10 times their weight), wherein it is easily soluble; then 20% of water were added thereto thus separating 15 parts of pure ergocornine-l-di-(p-toluyl)-bitartrate.

From 80% aqueous methanol the ergocornine-l-di-(p-toluyl)-bitartrate crystallizes out in form of beautiful thin hexagonal plates. Its decomposition point is 180° C. (corr.) and its specific rotation $[\alpha]_D^{20} = +103°$. ($c=0.2$ in ethanol).

The free base was obtained by treating the suspension of the salt in water with sodium bicarbonate and extraction with chloroform. By dissolving in methanol the amorphous residue obtained after evaporation of chloroform, the ergocornine crystallized out in beautiful polyhedrons. Decomposition point 182°–184° C. (corr.). Ergocornine is difficultly soluble in methanol, thus differing from ergocristine which is easily soluble in this solvent, and cannot be crystallized from methanol. With regard to the solubility ergocryptine has a middle position; it is easily soluble in methanol, but can be crystallized from this solvent. Ergocornine is also relatively difficultly soluble in ethanol and acetone. On cooling the hot saturated solution in benzene, it crystallizes out, like ergocristine and ergocryptine, in beautiful plates containing crystal solvent and possessing the same habitus as the benzene crystallizate of ergotoxine. $[\alpha]_D^{20} = -188°$;

$$[\alpha]_{5461}^{20} = -226°$$

($c=1$ in chloroform). The elementary analysis has given results corresponding to the formula $C_{31}H_{39}O_5N_5$.

By careful treatment of ergocornine with an alcoholic potassium hydroxide solution it can be transformed into its dextro-rotary isomer. Ergocorninine is easily soluble in methanol and ethanol. When crystallized from ethanol it gives beautiful prisms, decomposition point 220°–222° C. (corr.)) $[\alpha]_D^{20} = +409°$;

$$[\alpha]_{5461}^{20} = -510°$$

($c=1$ in chloroform). According to the elementary analysis ergocorninine has the formula $C_{31}H_{39}O_5N_5$.

On acid and alkaline hydrolysis and on thermic cleavage in high vacuo the following components of ergocornine have been isolated: lysergic acid, dimethyl-pyro-tartaric acid-amide, d-proline and l-valine. The condensation of these four cleavage components under separation of 3 molecules of water leads to the ergocornine and ergocorninine of the formula $C_{31}H_{39}O_5N_5$, which formula has been found on analysis.

By taking advantage of the different solubility of the three components it has been possible to obtain further quantities of pure salt fractions from the mother-lyes of the fractions I to III.

What we claim is:

1. A process for the separation of a mixture of basic compounds containing the lysergic acid radical, comprising the steps of treating a solution of the said mixture with a solution of a mononuclear, aroylated tartaric acid of the general formula

HOOC—CHOX—CHOX—COOH

wherein X stands for a mononuclear aroyl radical, and separating the pure salts thus obtained by fractional crystallization.

2. A process for the separation of a mixture of basic compounds containing the lysergic acid radical, comprising the steps of treating a solution of the said mixture with a solution of a dibenzoyl tartaric acid and separating the pure salts thus obtained by fractional crystallisation.

3. A process for the separation of a mixture of basic compounds containing the lysergic acid radical, comprising the steps of treating a solution of the said mixture with a solution of a ditoluyl tartaric acid and separating the pure salts thus obtained by fractional crystallisation.

4. A process for the separation of a mixture of basic compounds containing the lysergic acid radical, comprising the steps of treating a solution of a mixture of alkaloids known under the name of Ergotoxine with a solution of a ditoluyl tartaric acid and separating the pure salts thus obtained by fractional crystallization.

5. As new products of manufacture the salts of mixtures of basic compounds containing the lysergic acid radical with a mononuclear-aroylated tartaric acid of the general formula

HOOC—CHOX—CHOX—COOH

wherein X stands for a mononuclear aroyl radical, these salts being well crystallized compounds yielding on treatment with alkalis the free bases of the lysergic acid derivatives.

6. As new products of manufacture the salts of mixtures of basic compounds containing the lysergic acid radical with benzoylated tartaric acids of the general formula

HOOC—CHOX—CHOX—COOH

wherein X stands for benzoyl, these salts being well crystallized compounds yielding on treatment with alkalis the free bases of the lysergic acid derivatives.

7. As new products of manufacture the salts of mixtures of basic compounds containing the lysergic acid radical with toluylated tartaric acids of the formula

HOOC—CHOX—CHOX—COOH wherein X stands for toluyl, these salts being well crystallized compounds yielding on treatment with alkalis the free bases of the lysergic acid derivatives.

8. As new products of manufacture the optically active salts of basic compounds containing the lysergic acid radical with mononuclear-aroylated tartaric acids of the general formula

HOOC—CHOX—CHOX—COOH wherein X stands for a mononuclear aroyl radical, these salts being well crystallized compounds, yielding on treatment with alkalis the free bases of the lysergic acid derivatives.

9. As new products of manufacture the optically active salts of basic compounds containing the lysergic acid radical with optically active mononuclear-aroylated tartaric acids of the general formula

HOOC—CHOX—CHOX—COOH wherein X stands for a mononuclear aroyl radical, these salts being well crystallized compounds, yielding on treatment with alkalis the free bases of the lysergic acid derivatives.

10. As new products of manufacture the dextro-rotary salts of basic compounds containing the lysergic acid radical with mononuclear-aroylated tartaric acids of the general formula

HOOC—CHOX—CHOX—COOH wherein X stands for a mononuclear aroyl radical, these salts being well crystallized compounds yielding on treatment with alkalis the free bases of the lysergic acid derivatives.

11. As new products of manufacture the levo-rotary salts of basic compounds containing the lysergic acid radical with mononuclear-aroylated tartaric acids of the general formula

HOOC—CHOX—CHOX—COOH wherein X stands for a mononuclear aroyl radical, these salts being well crystallized compounds yielding on treatment with alkalis the free bases of the lysergic acid derivatives.

12. As new products of manufacture the optically active salts of basic compounds containing the lysergic acid radical with optically active dibenzoyl tartaric acids, these salts being well crystallized compounds yielding on treatment with alkalis the free bases of the lysergic acid derivatives.

13. As new products of manufacture the optically active salts of basic compounds containing the lysergic acid radical with optically active ditoluyl tartaric acids, these salts being well crystallized compounds yielding on treatment with alkalis the free bases of the lysergic acid derivatives.

14. The optically active salts of propanolamides containing the lysergic acid radical with dibenzoyl tartaric acids, which salts are well crystallized compounds yielding on treatment with alkalis the free bases of the lysergic acid derivatives.

15. The optically active salts of hydrazides containing the lysergic acid radical with ditoluyl tartaric acids, which salts are well crystallized compounds yielding on treatment with alkalis the free bases of the lysergic acid derivatives.

16. The optically active salts of the lysergic acid derivative called ergocristine with di-(p-toluyl)-tartaric acids.

ARTHUR STOLL.
ALBERT HOFMANN.

REFERENCES CITED

The following references are of record in the file of this patent:

UNITED STATES PATENTS

| Number | Name | Date |
|---|---|---|
| 2,090,429 | Stoll et al. | Aug. 17, 1937 |

OTHER REFERENCES

Gilman: "Organic Chemistry" (John Wiley & Sons, Inc., 1938; New York, N. Y.). Pages 191 and 192.

Hoppe-Seyler's Zeitschrift für Physiologische Chemie, vol. 250, pages 1–10 (1937); ibid., vol. 251, pages 155–163 (1938).

Certificate of Correction

Patent No. 2,447,214 — August 17, 1948

ARTHUR STOLL ET AL.

It is hereby certified that errors appear in the printed specification of the above numbered patent requiring correction as follows:

Column 2, line 31, for the words "he ergot" read *the ergot*; column 6, line 26, for "prims" read *prisms*; column 8, line 54, after "of A." insert *Stoll and E. Burckhardt (Hoppe-Seyler's Zeit-*; column 10, line 5, for that portion of the formula reading "—510°" read *+510°*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*